(12) United States Patent
Witt et al.

(10) Patent No.: US 12,371,529 B2
(45) Date of Patent: Jul. 29, 2025

(54) PROCESS FOR PURIFYING AN ALIPHATIC-AROMATIC POLYESTER

(71) Applicant: BASF SE, Ludwigshafen am Rhein (DE)

(72) Inventors: Timo Benjamin Witt, Ludwigshafen am Rhein (DE); Norbert Effen, Ludwigshafen am Rhein (DE); Jerome Lohmann, Ludwigshafen am Rhein (DE); Motonori Yamamoto, Ludwigshafen am Rhein (DE); Andreas Kuenkel, Ludwigshafen am Rhein (DE)

(73) Assignee: BASF SE, Ludwigshafen Am Rhein (DE)

( * ) Notice: Subject to any disclaimer, the term of this patent is extended or adjusted under 35 U.S.C. 154(b) by 556 days.

(21) Appl. No.: 17/612,246

(22) PCT Filed: May 19, 2020

(86) PCT No.: PCT/EP2020/063961
§ 371 (c)(1),
(2) Date: Nov. 18, 2021

(87) PCT Pub. No.: WO2020/234293
PCT Pub. Date: Nov. 26, 2020

(65) Prior Publication Data
US 2022/0195113 A1    Jun. 23, 2022

(30) Foreign Application Priority Data
May 22, 2019 (EP) .................................. 19175947

(51) Int. Cl.
*B01J 8/18* (2006.01)
*C08G 63/183* (2006.01)
*C08G 63/80* (2006.01)
*C08G 63/90* (2006.01)
*D04H 1/00* (2006.01)

(52) U.S. Cl.
CPC .......... *C08G 63/90* (2013.01); *C08G 63/183* (2013.01); *C08G 63/80* (2013.01)

(58) Field of Classification Search
CPC ...... C08G 63/90; C08G 63/80; C08G 63/183; C08G 63/18; B01J 8/00
USPC .......................................... 422/138; 442/361
See application file for complete search history.

(56) References Cited

U.S. PATENT DOCUMENTS

| | | | |
|---|---|---|---|
| 4,382,139 A | 5/1983 | Kapteina et al. | |
| 4,465,819 A | 8/1984 | Kosanovich et al. | |
| 5,373,029 A | 12/1994 | Naujoks et al. | |
| 2005/0163679 A1 | 7/2005 | Schulz Van Endert et al. | |
| 2007/0116615 A1* | 5/2007 | Schulz Van Endert | B01J 19/247 422/138 |
| 2016/0040334 A1* | 2/2016 | Allen, Jr. | D01F 6/90 442/361 |

FOREIGN PATENT DOCUMENTS

| | | |
|---|---|---|
| DE | 19528539 A1 | 2/1997 |
| EP | 2623540 A1 | 8/2013 |
| WO | 96/15173 A1 | 5/1996 |
| WO | 2009/127555 A1 | 10/2009 |
| WO | 2009/127556 A1 | 10/2009 |
| WO | 2019/096918 A1 | 5/2019 |
| WO | 2019/096920 A1 | 5/2019 |

OTHER PUBLICATIONS

International Search Report and Written Opinion received for PCT Patent Application No. PCT/EP2020/063961, mailed on Jun. 5, 2020, 9 pages.
European Search Report for EP Patent Application No. 19175947.1, Issued on Oct. 24, 2019, 3 pages.
International Preliminary Report on Patentability received for PCT Patent Application No. PCT/EP2020/063961, mailed on May 10, 2021, 10 pages.
Witt, et al., "Evaluation of the biodegradability of copolyesters containing aromatic compounds by investigations of model oligomers", Journal of Environmental Polymer Degradation, 1996, vol. 4, Issue 1, pp. 9-20.

* cited by examiner

*Primary Examiner* — Monzer R Chorbaji
(74) *Attorney, Agent, or Firm* — Faegre Drinker Biddle & Reath LLP

(57) ABSTRACT

The present invention relates to a continuous process for purifying an aliphatic-aromatic polyester constructed from aliphatic dicarboxylic acids, aromatic dicarboxylic acids and aliphatic diols in a degassing apparatus, wherein the crude polyester is degassed for 3 to 30 minutes at a pressure of 0.01 to 5 mbar in the presence of 1% to 7% by weight, based on the total weight of the crude polyester, of an entraining agent.

13 Claims, No Drawings

PROCESS FOR PURIFYING AN ALIPHATIC-AROMATIC POLYESTER

CROSS-REFERENCE TO RELATED APPLICATIONS

This application is a national stage application (under 35 U.S.C. § 371) of PCT/EP2020/063961, filed May 19, 2020, which claims benefit of European Application No. 19175947.1, filed May 22, 2019, both of which are incorporated herein by reference in their entirety.

The present invention relates to a continuous process for purifying a biodegradable, aliphatic-aromatic polyester constructed from aliphatic dicarboxylic acids, aromatic dicarboxylic acids and aliphatic diols in a degassing apparatus, wherein the crude polyester is degassed with an average residence time of 3 to 30 minutes and at a pressure of 0.01 to 5 mbar in the presence of 1% to 7% by weight, based on the total weight of the crude polyester, of an entraining agent. Particularly, the present invention relates to a continuous process for purifying polybutylene adipate coterephthalate and polybutylene sebacate coterephthalate; a polybutylene adipate coterephthalate obtainable by this process having a content by weight of the three cyclic ester dimers determined by LC-HRMS of from 500 to 1000 ppm, based on the total weight of the polyester and a polybutylene sebacate coterephtalate obtainable by this process having a content by weight of the monomer and three cyclic ester dimers determined by LC-HRMS of from 500 to 1000 ppm, based on the total weight of the polyester.

Processes for continuously producing aliphatic-aromatic polyesters such as polybutylene adipate coterephthalate (PBAT), polybutylene sebacate-co-terephthalate (PBSeT) or polybutylene succinate-co-terephthalate (PBST) are known from the literature (see WO-A 2009/127555 and WO-A 2009/127556). These documents describe the depletion of tetrahydrofuran formed. However, the processes described in these documents do not always result in depletion of the cyclic byproducts to obtain for example approval for contact with foodstuffs according to EU 10/2011.

EP-A 2623540 describes a process for purifying aliphatic polyesters such as polybutylene succinate (PBS), polybutylene succinate-co-adipate (PBSA) or polybutylene succinate-co-sebacate (PBSSe), in which cyclic byproducts are extracted by means of extraction with solvents. The disadvantage of this extraction process is that impurities trapped in the granulate cannot be depleted and contamination of the polyester with solvents can result. This process is altogether rather complex and costly.

The present invention accordingly has for its object to find an efficient and scaleable continuous process for purifying aliphatic-aromatic polyesters with reduced amount of cyclic ester oligomers, particularly cyclic ester dimers which have the highest relevance to obtain an approval for contact with foodstuffs according to EU 10/2011.

The inventors have surprisingly found a continuous process for purifying a aliphatic-aromatic polyester constructed from aliphatic dicarboxylic acids, aromatic acids and aliphatic diols in a degassing apparatus, wherein the crude polyester is degassed in the degassing apparatus for 3 to 30 minutes at a pressure of 0.01 to 5 mbar in the presence of 1% to 7% by weight, based on the total weight of the crude polyester, of an entraining agent. The invention is more particularly described hereinbelow.

Biodegradable aliphatic-aromatic (semiaromatic) polyesters are described by way of example in WO-A 96/15173 and WO-A 2009/127556.

In particular, biodegradable polyesters are aliphatic-aromatic polyesters whose structure is as follows:

A) an acid component composed of
  a1) from 40 to 70 mol % of at least one aliphatic dicarboxylic acid or its esters, or a mixture thereof,
  a2) from 30 to 60 mol % of at least one aromatic dicarboxylic acid or its esters, or a mixture thereof, and
  a3) from 0 to 5 mol % of a compound comprising sulfonate groups,
  where the total of the molar percentages of components a1) to a3) is 100%, and
B) a diol component composed of:
  b1) at least equimolar amounts with respect to component A of a $C_2$-$C_{12}$ alkanediol, or a mixture thereof, and
  b2) from 0 to 2% by weight, based on the amount of polyester after stage iii (which corresponds to the amount used of components A and B minus the reaction vapors removed), of a compound comprising at least 3 functional groups;
and
C) of from 0 to 10% by weight, preferably 0% by weight based on the total amount of components A and B of a component selected from:
  c1) at least one dihydroxy compound comprising ether functions and having the formula I $$HO-[(CH_2)_n-O]_m-H \quad (I)$$

where n is 2, 3 or 4 and m is a whole number from 2 to 250,
  c2) at least one hydroxycarboxylic acid of the formula IIa or IIb

  (IIa)

  (IIb)

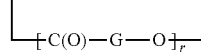

where p is a whole number from 1 to 1500 and r is a whole number from 1 to 4, and G is a radical selected from the group consisting of phenylene, —$(CH_2)_q$—, where q is a whole number from 1 to 5, —C(R)H— and —C(R)HCH$_2$, where R is methyl or ethyl,
  c3) at least one amino-$C_2$-$C_{12}$ alkanol, or at least one amino-$C_5$-$C_{10}$ cycloalkanol, or a mixture of these,
  c4) at least one diamino-$C_1$-$C_8$ alkane,
  c5) at least one aminocarboxylic acid compound selected from the group consisting of caprolactam, 1,6-aminocaproic acid, laurolactam, 1,12-aminolauric acid, and 1,11-aminoundecanoic acid,
  or mixtures composed of c1) bis c5),
and
D) from 0 to 4% by weight, preferably from 0.1 to 2% by weight, based on the amount of polyester after stage iii, of at least one component selected from the group d1) to d3)
  d1) of a di- or oligofunctional isoscyanate and/or isocyanurate,
  d2) of a di- or oligofunctional peroxide,
  d3) of a di- or oligofunctional epoxide,
In one preferred embodiment, the acid component A of the semiaromatic polyesters comprises from 40 to 60 mol %, of a1 and from 40 to 60 mol %, of a2. In one particularly preferred embodiment, the acid component A of the semi-aromatic polyesters comprises more than 50 mol % of aliphatic dicarboxylic acid a1). A feature of these polyesters is excellent biodegradability.

Aliphatic acids and the corresponding derivatives a1 which may be used are generally those having from 2 to 40 carbon atoms, preferably from 4 to 14 carbon atoms. They may be either linear or branched. The cycloaliphatic dicarboxylic acids which may be used for the purposes of the present invention are generally those having from 7 to 10 carbon atoms and in particular those having 8 carbon atoms. In principle, however, it is also possible to use dicarboxylic acids having a larger number of carbon atoms, for example having up to 30 carbon atoms.

Examples which may be mentioned are: malonic acid, succinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, fumaric acid, 2,2-dimethylglutaric acid, suberic acid, dimer fatty acid (e.g. Empol® 1061 from Cognis), 1,3-cyclopentanedicarboxylic acid, 1,4-cyclohexanedicarboxylic acid, 1,3-cyclohexanedicarboxylic acid, diglycolic acid, itaconic acid, maleic acid, maleic anhydride, and 2,5-norbornanedicarboxylic acid.

Ester-forming derivatives of the abovementioned aliphatic or cycloaliphatic dicarboxylic acids which may also be used and which may be mentioned are in particular the di-$C_1$-$C_6$-alkylesters, such as dimethyl, diethyl, di-n-propyl, diisopropyl, di-n-butyl, diisobutyl, di-tert-butyl, di-n-pentyl, diisopentyl or di-n-hexylesters. It is also possible to use anhydrides of the dicarboxylic acids.

The dicarboxylic acids or their ester-forming derivatives may be used here individually or in the form of a mixture composed of two or more of these.

It is preferable to use succinic acid, adipic acid, azelaic acid, sebacic acid, brassylic acid, or their respective ester-forming derivatives, or a mixture thereof. It is particularly preferable to use succinic acid, adipic acid, or sebacic acid, or their respective ester-forming derivatives, or a mixture thereof. It is particularly preferable to use adipic acid or its ester-forming derivatives, for example its alkyl esters or a mixture of these. Sebacic acid or a mixture of sebacic acid with adipic acid is preferably used as aliphatic dicarboxylic acid.

Succinic acid, azelaic acid, sebacic acid, and brassylic acid have the additional advantage of being available in the form of renewable raw materials.

Aromatic dicarboxylic acids a2 which may be mentioned are generally those having from 6 to 12 carbon atoms and preferably those having 8 carbon atoms. By way of example, mention may be made of terephthalic acid, isophthalic acid, 2,5-furanedicarboxylic acid, 2,6-naphthoic acid and 1,5-naphthoic acid, 2,5-furandicarboxylic acid, and also ester-forming derivatives of these. Particular mention may be made here of the di-$C_1$-$C_6$-alkylesters, e.g. dimethyl, diethyl, di-n-propyl, diisopropyl, di-n-butyl, diisobutyl, di-tert-butyl, di-n-pentyl, diisopentyl, or di-n-hexylesters. The anhydrides of the dicarboxylic acids a2 are also suitable ester-forming derivatives.

However, in principle it is also possible to use aromatic dicarboxylic acids a2 having a greater number of carbon atoms, for example up to 20 carbon atoms.

The aromatic dicarboxylic acids or ester-forming derivatives of these a2 may be used individually or as a mixture of two or more of these. It is particularly preferable to use terephthalic acid or its ester-forming derivatives, such as dimethyl terephthalate.

The compound used comprising sulfonate groups is usually one of the alkali metal or alkaline earth metal salts of a dicarboxylic acid comprising sulfonate groups or ester-forming derivatives thereof, preferably alkali metal salts of 5-sulfoisophthalic acid or a mixture of these, particularly preferably the sodium salt.

According to one of the preferred embodiments, the acid component A comprises from 40 to 60 mol % of a1, from 40 to 60 mol % of a2, and from 0 to 2 mol % of a3.

The diols B are generally selected from branched or linear alkanediols having from 2 to 12 carbon atoms, preferably from 4 to 6 carbon atoms.

Examples of suitable alkanediols are ethylene glycol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, in particular in combination with adipic acid as component a1) and 1,4-butanediol and 1,3-propanediol, in particular in combination with sebacic acid as component a1). 1,4 butanediol and 1,3-propanediol has the additional advantage of being obtainable in the form of a renewable raw material. It is also possible to use mixtures of different alkanediols.

The ratio of component b1 (diol) to diacids A generally set in stages i) and ii) of the process is from 1.5 to 2.5 and preferably from 1.8 to 2.2.

The compounds b2) preferably comprise crosslinking agents comprising at least three functional groups. Particularly preferred compounds have from three to six hydroxy groups. Examples that may be mentioned are: tartaric acid, citric acid, malic acid; trimethylolpropane, trimethylolethane; pentaerythritol; polyethertriols, and glycerol, trimesic acid, trimellitic acid, trimellitic anhydride, pyromellitic acid, and pyromellitic dianhydride. Preference is given to polyols, such as trimethylolpropane, pentaerythritol, and in particular glycerol. The compounds b2 can act as branching agents or else as crosslinking agents. By using components b2, it is possible to construct biodegradable polyesters which are pseudoplastic. The rheology of the melts improves; the biodegradable polyesters are easier to process, for example easier to draw by melt-solidification processes to give foils. The compounds b2 have a shear-thinning effect, and viscosity therefore decreases under load.

The amounts used of the compounds b2 are preferably from 0.01 to 2% by weight, with preference from 0.05 to 1% by weight, with particular preference from 0.08 to 0.20% by weight, based on the total amount of polymer.

The polyesters on which the polyester mixtures of the invention are based can comprise further components alongside components A and B.

The component d1 used comprises an isocyanate or a mixture of various isocyanates. It is possible to use aromatic or aliphatic diisocyanates. However, it is also possible to use isocyanates of higher functionality.

For the purposes of the present invention, an aromatic diisocyanate d1 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, or xylylene diisocyanate.

Among these, particular preference is given to diphenylmethane 2,2'-, 2,4'-, or 4,4'-diisocyanate as component d1. The latter diisocyanates are generally used in the form of a mixture.

An isocyanate d1 that can also be used, having three rings, is tri(4-isocyanatophenyl) methane. Polynuclear aromatic diisocyanates are produced by way of example during production of diisocyanates having one or two rings.

Component d1 can also comprise subordinate amounts of uretdione groups, for example up to 5% by weight, based on the total weight of component d1, for example for capping of the isocyanate groups.

For the purposes of the present invention, an aliphatic diisocyanate d1 is especially any of the linear or branched alkylene diisocyanates or cycloalkylene diisocyanates having from 2 to 20 carbon atoms, preferably from 3 to 12 carbon atoms, examples being hexamethylene 1,6-diisocyanate, isophorone diisocyanate, or methylenebis(4-isocyanatocyclohexane). Particularly preferred aliphatic diisocyanates d1 are isophorone diisocyanate and especially hexamethylene 1,6-diisocyanate.

Among the preferred isocyanurates are the aliphatic isocyanurates that derive from alkylene diisocyanates or from cycloalkylene diisocyanates, where these have from 2 to 20 carbon atoms, preferably from 3 to 12 carbon atoms, examples being isophorone diisocyanate or methylenebis(4-isocyanatocyclohexane). These alkylene diisocyanates can be either linear or branched compounds. Particular preference is given to isocyanurates based on n-hexamethylene diisocyanate, examples being cyclic trimers, pentamers, or higher oligomers of hexamethylene 1,6-diisocyanate.

The amounts generally used of component d1 are from 0 to 4% by weight, preferably from 0.1 to 2% by weight, particularly preferably from 0.2 to 1.2% by weight, based on the total amount of polymer.

Examples of suitable di- or oligofunctional peroxides (component d2) are the following compounds: benzoyl peroxide, 1,1-bis(tert-butylperoxy)-3,3,5-trimethylcyclohexane, 1,1-bis(tert-butylperoxy)methylcyclododecane, n-butyl 4,4-bis(butylperoxy)valerate, dicumyl peroxide, tert-butyl peroxybenzoate, dibutyl peroxide, α,α-bis(tert-butylperoxy) diisopropylbenzene, 2,5-dimethyl-2,5-di(tert-butylperoxy)hexane, 2,5-dimethyl-2,5-di(tertbutylperoxy) hex-3-yne, and tert-butylperoxycumene.

The amount used of component d2 is from 0.01 to 4% by weight, preferably from 0.1 to 2% by weight, and particularly preferably from 0.2 to 1% by weight, based on the biopolymer.

The component d3 used can comprise difunctional or oligofunctional epoxides, such as: hydroquinone, diglycidyl ether, resorcinol diglycidyl ether, 1,6-hexanediol diglycidyl ether, and hydrogenated bisphenol A diglycidyl ether. Other examples of epoxides comprise diglycidyl terephthalate, diglycidyl tetrahydrophthalate, diglycidyl hexahydrophthalate, dimethyldiglycidyl phthalate, phenylene diglycidyl ether, ethylene diglycidyl ether, trimethylene diglycidyl ether, tetramethylene diglycidyl ether, hexamethylene diglycidyl ether, sorbitol diglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentyl glycol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, and polybutylene glycol diglycidyl ether.

A particularly suitable component d3 is a copolymer comprising epoxy groups and based on styrene, acrylic ester and/or methacrylic ester d3. The units bearing epoxy groups are preferably glycidyl (meth)acrylates. Compounds that have proven advantageous are copolymers having a proportion of more than 20% by weight, particularly preferably more than 30% by weight, and with particular preference more than 50% by weight, of glycidyl methacrylate in the copolymer. The epoxy equivalent weight (EEW) in these polymers is preferably from 150 to 3000 g/equivalent, particularly preferably from 200 to 500 g/equivalent. The average molecular weight (weight average) $M_W$ of the polymers is preferably from 2000 to 25 000, in particular from 3000 to 8000. The average molecular weight (number average) $M_n$ of the polymers is preferably from 400 to 6000, in particular from 1000 to 4000. The polydispersity (Q) is generally from 1.5 to 5. Copolymers of the abovementioned type comprising epoxy groups are marketed by way of example by BASF Resins B.V. with trademark Joncryl® ADR. Particularly suitable chain extenders are Joncryl® ADR 4368, Joncryl® ADR 4468, long-chain acrylates as described in EP Application No. 08166596.0, and Cardura® E10 from Shell.

The amount of component d3 used, based on the biopolymer, is from 0.01 to 4% by weight, preferably from 0.1 to 2% by weight, and particularly preferably from 0.2 to 1% by weight. Component d3 can also be used as acid scavenger. In this embodiment, it is preferable that the concentration used of d3 is from 0.01 to 0.5% by weight, and that this is followed by chain extension using component d1, d2 and/or d3a, the concentration of which added is preferably from 0.2 to 1.2% by weight.

Particular preference is given to biodegradable, aliphatic-aromatic polyester: polybutylene adipate coterephthalate (PBAT) which comprises, as component A: 45 to 55 mol % of adipic acid (component a1) and 45 to 55 mol % of terephthalic acid (component a2)); as diol component (component B): 100 mol % 1,4-butanediol; as component b2) 0.03 to 2% by weight, based on the polyester, glycerol, pentaerythritol, and trimethylolpropane as component d1) 0 to 2%, preferably 0.1 to 1% by weight, based on the polyester, hexamethylene diisocyanate.

Another particular preference is given to biodegradable, aliphatic-aromatic polyester: polybutylene sebacate coterephthalate (PBSeT) which comprises, as component A: 45 to 55 mol % of sebacic acid (component a1) and 45 to 55 mol % of terephthalic acid (component a2)); as diol component (component B): 100 mol % 1,4-butanediol; as component b2) 0.03 to 2% by weight, based on the polyester, glycerol, pentaerythritol, and trimethylolpropane as component d1) 0 to 2%, preferably 0.1 to 1% by weight, based on the polyester, hexamethylene diisocyanate.

The aliphatic-aromatic polyesters are generally random copolyesters, i.e. the aromatic and aliphatic diacid units are incorporated entirely randomly. The distribution of the lengths of the individual blocks can be calculated by the method of B. Vollmert, Grundriss der makromolekularen Chemie [Basic principles of macromolecular chemistry]. As described by Witt et al. in J. Environ. Pol. Degradation, volume 4, No. 1 (1996), page 9, degradation of aromatic model oligomers where n≥3 in compost is normally very slow. However, in the case of aliphatic-aromatic polyesters, block structures are rapidly degraded.

The molar mass (Mn) of the aliphatic-aromatic polyesters, preferably polybutylene adipate coterephthalate or polybutylene sebacate coterephthalate is generally in the range from 1000 to 100 000 g/mol, in particular in the range from 9000 to 75 000 g/mol, preferably in the range from 20 000 to 50 000 g/mol, and their molar mass (Mw) is generally from 50 000 to 300 000 g/mol, preferably from 75 000 to 200 000 g/mol, and their Mw/Mn ratio is generally from 1 to 6, preferably from 2 to 4. The melting point is in the range from 60 to 170° C., preferably in the range from 80 to 150° C.

In one preferred embodiment of the invention, the MVR (melt volume rate) to EN ISO 1133 (190° C., 2.16 kg weight) after stage iv is generally from 0.5 to 6.0 $cm^3/10$ min, preferably from 1.0 to 5.0 $cm^3/10$ min, and particularly preferably from 1.5 to 3 $cm^3/10$ min.

In another preferred embodiment of the invention, the MVR (melt volume rate) to EN ISO 1133 (190° C., 2.16 kg weight) after stage iv is generally from 2 to 100 $cm^3/10$ min, preferably from 3 to 50 $cm^3/10$ min, and particularly preferably from 5 to 20 $cm^3/10$ min.

The viscosity numbers of the biodegradable aliphatic-aromatic polyesters to DIN 53728 are generally high and from 160 to 250 $cm^3/g$, preferably from 170 to 220 $cm^3/g$. The dimension for the viscosity numbers below is always $cm^3/g$.

It is desirable to provide aliphatic-aromatic copolyesters which not only have high viscosity numbers but also have low acid number to DIN EN 12634. The lower the acid number of the aliphatic-aromatic copolyesters, the greater the hydrolysis resistance of the polyesters, either alone or in a mixture with biopolymers such as starch (thermoplastified or not plastified), polylactide (PLA), polyhydroxyalkanoates, aliphatic polyester such as Bionolle®, cellulose, or polycaprolactone. The shelf life of the polyesters or polyester mixtures improves accordingly.

In a preferred embodiment the biodegradable, aliphatic-aromatic polyester, preferably polybutylene adipate terephthalate is prepared according to WO-A 2009/127555 and WO-A 2009/127556 comprising the following stages:
 i) in a first stage, a mixture composed of the aliphatic dihydroxy compounds, of the aliphatic and aromatic dicarboxylic acids, and, if appropriate, of further comonomers (component C) is mixed, optionally with addition of a catalyst, to give a paste, or, as an alternative, the liquid esters of the dicarboxylic acids are fed into the system, as also are the dihydroxy compound and, if appropriate, further comonomers, this mixture, together with the entire amount or with a portion of the catalyst, is continuously esterified or, respectively, transesterified;
 ii) in a second stage, the transesterification or, respectively, esterification product obtained in i) is continuously precondensed if appropriate with the remaining amount of catalyst to viscosity numbers of from 20 to 70 $cm^3/g$ to DIN 53728;
 iii) in a third stage, the product obtainable from ii) is continuously polycondensed to viscosity numbers of from 60 to 170 $cm^3/g$ to DIN 53728, and
 iv) in a fourth stage, the product obtainable from iii) is reacted continuously with a chain extender D in a polyaddition reaction to viscosity numbers of from 150 to 320 $cm^3/g$ to DIN 53728.

The fully reacted melt is generally transferred directly by way of a melt filter to the finishing process, for example underwater pelletization.

For the purposes of the present invention, the feature "biodegradable" is achieved by a substance or a substance mixture if this substance or the substance mixture exhibits, as defined in DIN EN 13432, a percentage degree of biodegradation of at least 90%.

Biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyester with compost and storing it for a particular period. By way of example, according to DIN EN 13432, $CO_2$-free air is passed through ripened compost during the composting process, and the compost is subjected to a defined temperature profile. The biodegradability here is defined as a percentage degree of biodegradation by way of the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit marked signs of degradation after just a few days of composting, examples being fungal growth, cracking, and perforation.

Other methods for determining biodegradability are described by way of example in ASTM D5338 and ASTM D6400.

EU Regulation 10/2011 specifies migration limits of substances in plastics materials that are in contact with food products. Packaging materials made of non-purified aliphatic-aromatic polyesters such as polybutylene adipate terephthalate (PBAT) do not necessarily meet the requirements of this standard and are restricted in their application as food contact material. Especially the cyclic impurities in the polyester such as THF, cyclic monomers, dimers, trimers and tetramers can migrate out of the packaging material under the various test conditions. The process according to the invention now provides aliphatic-aromatic polyesters which are distinctly depleted in cyclic impurities and which achieve the threshold values required in EU Regulation 10/2011.

The purification process of the invention is described in more detail below.

The preferred chain-extended aliphatic-aromatic polyesters are produced as described in the literature or in the introduction.

In the chain extension the polycondensed polyester is introduced into an extruder, a continuous kneader (List reactor) or a static mixer together with 0.01% to 4% by weight, preferably 0.1% to 2% by weight and especially preferably 0.5% to 1.2% by weight based on the polyester of a chain extender. Internals that may be employed include: in the case of a static mixer SMR, SMX, or SMXL elements or combinations thereof, for example from Sulzer Chemtech AG, Switzerland. Examples of a List reactor include depending on the field of application a single-screw DISCOTHERM B reactor or twin-screw CRP and ORP reactors. Suitable extruders include single-screw or twin-screw extruders.

Suitable chain extenders include the above-described isocyanates or isocyanurates d1, peroxides d2 and epoxides d3. These diisocyanates are selected for example from the group consisting of tolylene 2,4-diisocyanate, tolylene 2,6-diisocyanate, 4,4'- and 2,4'-diphenylmethane diisocyanate, naphthylene 1,5-diisocyanate, xylylene diisocyanate, hexamethylene diisocyanate, isophorone diisocyanate and methylenebis(4-isocyanatocyclohexane). Hexamethylene diisocyanate is particularly preferred.

The chain extension reaction is carried out at reaction temperatures of 220° C. to 270° C., preferably 230° C. to 250° C., and at superatmospheric pressure or atmospheric pressure depending on the system used. Residence times of 2 to 30 minutes, preferably 4 to 15 minutes, allow production of aliphatic-aromatic polyesters having a viscosity number according to DIN 53728 of from 160 to 250 cm$^3$/g, preferably from 170 to 220 cm$^3$/g and acid numbers according to DIN EN 12634 of preferably 0.5 to 1.2 mg KOH/g and especially preferably of 0.6 to 1.0 mg KOH/g.

In one embodiment of the invention, the MVR (melt volume rate) according to EN ISO 1133 (190° C., 2.16 kg weight) of the aliphatic-aromatic polyester is generally 0.1 to 6.0 cm$^3$/10 min, preferably 0.5 to 5.0 cm$^3$/10 min and particularly preferably 1.0 to 3 cm$^3$/10 min. The viscosity number according to DIN 53728 of the aliphatic-aromatic polyesters are from 160 to 250 cm$^3$/g, preferably from 170 to 220 cm$^3$/g. The dimension for the viscosity numbers is always cm$^3$/g.

In another embodiment of the invention, the MVR (melt volume rate) according to EN ISO 1133 (190° C., 2.16 kg weight) of the aliphatic-aromatic polyester is generally 2 to 100 cm$^3$/10 min, preferably from 3 to 50 cm$^3$/10 min, and particularly preferably from 5 to 20 cm$^3$/10 min. The viscosity number according to DIN 53728 of the aliphatic-aromatic polyesters are from 80 to 200 cm$^3$/g, preferably from 100 to 150 cm$^3$/g.

The reactor in which the chain reaction is performed has the above-described internals which ensure thorough commixing of the product stream.

Due to the marked viscosity increase during the chain extension reaction it may be advantageous to run the chain extension reaction in the reactor only until the chain extender has fully reacted at least with one functional unit. Chain formation may be completed for example in a separate stirred tank or in a tube without internals. This makes it possible to avoid blockages and wall deposits.

The fully reacted melt is generally transferred directly to the degassing apparatus.

The purification according to the invention of the aliphatic-aromatic polyester constructed from aliphatic dicarboxylic acids, aromatic dicarboxylic acids and aliphatic diols is carried out in a degassing apparatus, wherein the crude polyester resides in the degassing apparatus for 3 to 30 minutes at a pressure of 0.01 to 5 mbar in the presence of 1% to 7% by weight, based on the total weight of the crude polyester, of an entraining agent.

In a preferred embodiment of the process according to the invention, a thin film evaporator is selected as degassing apparatus. The thin film evaporator has the following general characteristics: The evaporator surface is a tube having a mechanical stirring means in the middle. The melt is passed on to the vertical evaporator surface from above. The thin film evaporator generates a thin film (melt film) on the inner wall of a heated outer shell by mechanical means using a rotor. This results in continuous surface replacement, thus ensuring good mass transfer and therefore a high degassing performance. The degassing performance is achieved by addition of a stripping agent (for example water or steam) which is supplied in countercurrent. Also required for good degassing performance is a vacuum of not more than 5 mbar.

The shape and configuration of the individual rotor blades allows transport of the viscous product to the discharge section of the processor. The film thickness and the melt conveying is likewise dependent on the geometry of the rotor blades. The large free gas volume allows a high evaporative concentration ratio in one stage without the risk of product entrainment into the condensation system.

The following conditions apply to the degassing apparatus: the average residence times in the degassing apparatus are 3 to 30 minutes—longer residence times would lead to increased degradation of the polycondensed polyester (e.g. PBAT), with shorter residence times, the depletion of the cyclic oligomers is not satisfactory enough.

The temperatures employed in the degassing apparatus are generally 180° C. to 280° C. and preferably 200° C. to 250° C.

The entraining agent is preferably introduced into the gas space of the degassing apparatus. This has the advantage that a homogeneous polyester film is formed in the degassing apparatus and for example blister formation or foaming in the polyester film are avoided.

Suitable entraining agents are, as described above, water, ethanol, nitrogen, carbon dioxide, acetone and cyclic polypropylene carbonate. Nitrogen is a preferred entraining agent and water which is introduced into the gas space of the degassing apparatus as steam is particularly preferred.

The amount of the entraining agent is generally between 1% and 7% by weight, preferably 2% to 5% by weight, based on the polyester at the end of stage iii). Greater amounts of entraining agent result in an unacceptable impairment of the vacuum established in the degassing apparatus. At a lower entraining agent concentration the crude polyester (e.g. PBAT) is insufficiently depleted in cyclic impurities of the polyester such as THF and cyclic ester monomers, dimers, trimers and tetramers and particularly of cyclic ester monomers and dimers.

In the degassing apparatus the polymer melt generally forms an average film thickness of less than 5 mm, preferably less than 2 mm and especially preferably less than 1 mm.

Suitable degassing apparatuses, in addition to the preferred thin film evaporator, include a spinning-disc reactor, cage reactor, falling film evaporator or planetary roll extruder.

The aliphatic-aromatic polyesters obtainable by the process according to the invention such as for example PBAT are suitable for numerous applications such as injection molded products, thermoforming products, extrusion coated products, and particularly for films or foams. The aliphatic-aromatic polyesters are often employed in mixtures with further biopolymers such as polylactic acid, polyhydroxyalkanoates, biodegradable aliphatic-aromatic polyesters, starch, mineral fillers or other additives such as for example lubricants, nucleating agents, plasticizers or pigments.

The process according to the invention makes it possible to achieve a distinct depletion of cyclic impurities. In the case of 1,4-butanediol-containing polyesters the residual THF content of the aliphatic polyester may generally be reduced to two third or preferably a half and especially preferably to less than a quarter of the original THF content. The purified aliphatic-aromatic polyester generally has a residual THF content of less than 300 ppm, preferably less than 200 ppm and especially preferably less than 100 ppm.

The cyclic oligomers content of the aliphatic-aromatic polyester can also be distinctly reduced.

In the case of PBAT for example the process according to the invention generally reduces the content of dimeric ester cycles (comprising the 3 cyclic dimers: Cyclic 2AA 2BDO is the cyclic dimer polyester containing two adipic acid units and two 1,4-butanediol units; Cyclic AA TPA 2BDO is the cyclic dimer polyester containing adipic acid, terephthalic acid and two 1,4-butanediol units and Cyclic 2TPA 2BDO is the cyclic dimer polyester containing two terephthalic acid units and two 1,4-butanediol units) by more than 20%, preferably more than 30% and in particular more than 40%. The content of trimeric ester cycles (comprising the 4 cyclic trimers: Cyclic 3AA 3BDO is the cyclic trimer polyester containing three adipic acid units and three 1,4-butanediol units; Cyclic 2AA TPA 3BDO is the cyclic trimer polyester containing two adipic acid units, terephthalic acid and three 1,4-butanediol units, Cyclic AA 2TPA 3BDO is the cyclic trimer polyester containing adipic acid, two terephthalic acid units and three 1,4-butanediol units, and Cyclic 3TPA 3BDO is the cyclic trimer polyester containing three terephthalic acid units and three 1,4-butanediol units) is reduced by more than 5%, preferably more than 7% and in particular more than 10%. Note that as a consequence of thermodynamic reasons, smaller (<14 ring members) and more volatile cyclic esters such as monomeric ester cycle (Cyclic AA BDO) are already of low content but will also be further reduced by more than 50%, preferably more than 60% and in particular more than 70% by the process according to the invention. Thus, the final content of monomeric ester cycle (Cyclic AA BDO) in the purified PBAT is in general lower than 15 ppm, preferable below 10 ppm and particular preferred below 8 ppm. In a component part produced from PBAT such as a film, especially the small monomeric and dimeric ester cycles undergo more severe migration than the correspondingly higher oligomers. The disruptive cyclic ester dimers in PBAT may generally be reduced to less than 1200 ppm, preferably from 500 to 1000 ppm and especially preferably from 700 to 900 ppm based on the weight of PBAT. The efficient depletion of the cyclic ester dimers and the further depletion of the already low amount of cyclic ester monomer (Cyclic AA BDO) in the process according to the invention makes it possible to obtain approval for contact with foodstuffs according to EU 10/2011. The total amount of cyclic ester oligomers (monomer, dimers, trimers, tetramers and pentamers) is reduced by the process according to the invention below 3800 ppm, preferably below 3500 ppm, based on the weight of PBAT.

The present purification process led to a better depletion of the three cyclic ester dimers vs. the four cyclic ester trimers. Accordingly, purified polybutylene adipate coterephthalate was obtained wherein the ratio of the three cyclic ester dimers vs. the four cyclic ester trimers—determined by LC-HRMS—was lower than 1, preferably between 0.5 and 0.8, based on the total weight of purified polybutylene adipate coterephthalate.

In the case of polybutylene sebacate coterephthalate (PBSeT) the process according to the invention generally reduces the content of monomeric ester cycle (Cyclic SeA BDO is the cyclic monomer containing sebacic acid and 1,4-butanediol) and dimeric ester cycle (comprising the 3 cyclic dimers: Cyclic 2SeA 2BDO is the cyclic dimer polyester containing two sebacic acid units and two 1,4-butanediol units; Cyclic SeA TPA 2BDO is the cyclic dimer polyester containing sebacic acid, terephthalic acid and two 1,4-butanediol units and Cyclic 2TPA 2BDO is the cyclic dimer polyester containing two terephthalic acid units and two 1,4-butanediol units) by more than 20%, preferably more than 30% and in particular more than 40%. The content of trimeric ester cycles (comprising the 4 cyclic trimers: Cyclic 3SeA 3BDO is the cyclic trimer polyester containing three sebacic acid units and three 1,4-butanediol units; Cyclic 2SeA TPA 3BDO is the cyclic trimer polyester containing two sebacic acid units, terephthalic acid and three 1,4-butanediol units, Cyclic SeA 2TPA 3BDO is the cyclic trimer polyester containing sebacic acid, two terephthalic acid units and three 1,4-butanediol units, and Cyclic 3TPA 3BDO is the cyclic trimer polyester containing three terephthalic acid units and three 1,4-butanediol units) is reduced by more than 5%, preferably more than 7% and in particular more than 10%. In a component part produced from PBSeT such as a film, especially the small monomeric and dimeric ester cycles undergo more severe migration than the correspondingly higher oligomers. The disruptive cyclic ester monomer and dimers in PBSeT may generally be reduced to less than 1300 ppm, preferably from 500 to 1100 ppm and especially preferably from 700 to 950 ppm based on the weight of PBSeT. The efficient depletion of the cyclic ester monomers and dimers in the process according to the invention makes it possible to obtain approval for contact with foodstuffs according to EU 10/2011. The total amount of cyclic ester oligomers (monomer, dimers, trimers, tetramers and pentamers) is reduced by the process according to the invention below 4200 ppm, preferably below 3800 ppm, based on the weight of PBSeT.

The present purification process led to a better depletion of the three cyclic ester dimers vs. the four cyclic ester trimers. Accordingly, purified polybutylene sebacate adipate coterephthalate was obtained wherein the ratio of the three cyclic ester dimers vs. the four cyclic ester trimers—determined by LC-HRMS—was lower than 1,2, preferably between 0.6 and 1, based on the total weight of purified polybutylene sebacate coterephthalate.

In a preferred embodiment the purification process according to the invention succeeds the polycondensation stage and particularly preferred the chain extension of the crude polyester and precedes the isolation of the final pure polyester. Thus, e.g. PBAT is preferably produced according to WO 2009/127556 and the present purification process is inserted in between the chain extension with hexamethylene-diisocyanate and the isolation of the pure PBAT via under water granulation. The melt of the crude PBAT is directly transferred as hot melt to the thin film evaporator.

A particularly preferred embodiment of the process comprises the following stages (stages i) to iv) see WO-A 2009/127556):

i) in a first stage, a mixture composed of the aliphatic dihydroxy compounds, of the aliphatic and aromatic dicarboxylic acids, and, if appropriate, of further comonomers (component C) is mixed, optionally with addition of a catalyst, to give a paste, or, as an alternative, the liquid esters of the dicarboxylic acids are fed into the system, as also are the dihydroxy compound and, if appropriate, further comonomers, this mixture, together with the entire amount or with a portion of the catalyst, is continuously esterified or, respectively, transesterified;

ii) in a second stage, the transesterification or, respectively, esterification product obtained in i) is continuously precondensed if appropriate with the remaining amount of catalyst to viscosity numbers of from 20 to 70 cm$^3$/g to DIN 53728;

iii) in a third stage, the product obtainable from ii) is continuously polycondensed to viscosity numbers of from 60 to 170 cm$^3$/g to DIN 53728, and iv) in a fourth stage, the product obtainable from iii) is reacted continuously with a chain extender D in a polyaddition reaction to viscosity numbers of from 150 to 320 cm$^3$/g to DIN 53728 and v) in a fifth stage, the crude polyester is transferred in a degassing apparatus, wherein the crude polyester is degassed with an average residence time of 3 to 30 minutes and at a pressure of 0.01 to 5 mbar in the presence of 1% to 7% by weight, based on the total weight of the crude polyester, of an entraining agent.

The purified melt is generally transferred directly by way of a melt filter to the finishing process, for example underwater pelletization.

To produce polyester mixtures or polyester formulations it has proven advantageous when after the degassing apparatus the aliphatic-aromatic polyester depleted of cyclic impurities is continuously sent for compounding with further polymers and auxiliaries without intermediate isolation such as for example underwater granulation. In addition to the cost-saving achieved by omitting the granulation stage the aliphatic-aromatic polyester need not be melted. Renewed formation of cyclic impurities that might result from thermal stress can therefore be avoided.

The process according to the invention makes it possible to scalably and efficiently produce aliphatic-aromatic polyesters which are also poor in cyclic ester impurities.

Methods of Measurement:

Viscosity numbers were determined according to DIN 53728 Part 3, Jan. 3, 1985. The solvent mixture: phenol/dichlorobenzene in a 50/50 weight ratio was employed.

The melt of volume rate (MVR) was determined according to ISO 1133. Test conditions of 190° C., 2.16 kg were used. The melting time was 4 minutes. The MVR describes the rate of extrusion of a molten plastics molding composition through an extrusion die of defined length and defined diameter under the above-described conditions: temperature, loading and piston position. The volume extruded in a defined time in the barrel of an extrusion plastometer is determined.

Performance Testing:

The molecular weights Mn and Mw of the semiaromatic polyesters were determined by SEC according to DIN 55672-1. Eluent: hexafluoroisopropanol (HFIP)+0.05% by weight potassium trifluoroacetate; calibration performed with narrow-distribution polymethyl methacrylate standards. Evaluation had to be aborted after 18.83 mL (about M=300 g/mol) since the chromatogram is disrupted by impurities in the sample/in the SEC eluent for smaller molar masses.

Melt volume rate MVR at 190° C. and 2.16 kg according to ISO 1133-1 DE

Analysis of Cyclic Oligomers:

The oligomers were characterized by liquid chromatography/high resolution mass spectrometry (LC-HRMS)—this method had the advantage in comparison to gas chromatography coupled with mass spectroscopy (GC-MS) that the higher cyclic oligomers (>600 Daltons) were reproducibly measured.

i) Extraction of Oligomers 100 g of each sample was extracted with 150 ml acetonitrile (ACN) for 5 days at 40° C. by total immersion. The supernatant solution was diluted with 150 ml ACN/water (1/1, v/v) and filtered through a PTFE membrane (0.45 μm) before being analysed by LC-HRMS analysis.

ii) Identification and Quantification of Oligomers by Screening LC-HRMS

For the quantification of identified oligomers, the dissolved and diluted polymer extracts were analyzed by LC-HRMS using a Thermo Scientific Ultimate 3000 HPLC system equipped with a XBridge BEH (C18) column (particle size 2.5 μm, 150×2.1 mm) as stationary phase. The mobile phase consisted of water with 0.1% formic acid (A) and methanol with 0.1% formic acid (B). The gradient started at 40% B and was held for 1 min, then raised to 100% B in 12 min, held at 100% B for 6 min and finally equilibrated at 40% B for 5 min. The total runtime of the gradient program was 24 min. The flow rate was 0.35 mL/min, the column temperature was 40° C. The LC systems was coupled to a heated electrospray ionisation source of a high resolution mass spectrometer Q Exactive Plus Orbitrap from Thermo Scientific. The positive ionization mode was used for identification as well as quantification. The following instrumental parameters were used: spray voltage 4 kV, capillary temperature 320° C., sheath gas flow rate 30.00, aux gas flow rate 6.00, S-lens RF level 55.00, probe heater temperature 250.00° C. For identification data dependent MS/MS-experiments were measured as following: Full MS scan was measured with resolution of R=140.000 in profile mode, AGC target 3e6, maximum injection time of 100 ms and within a m/z-range of 150-1500. MS/MS spectra were acquired with a resolution of R=35.000 in profile mode, AGC target 1e5, maximum injection time of 50 ms, isolation window m/z=2.0 and normalized stepped collision energy of nce=20; 30; 40. The data were recorded and evaluated using Thermo Xcalibur software. The Oligomers for quantification were identified based on their accurate mass and fragmentation spectra.

For quantification of the identified oligomers, a high resolution Full MS scan was used as follows: Full MS scan was measured with resolution of R=140.000 in profile mode, AGC target 3e6, maximum injection time of 100 ms and within a m/z-range of 150-1500. Identified oligomers were semi-quantified using external calibration. Due to the lack of standard substances two references were chosen as standard analogues. For oligomers consisting only of terephthalic acid and butanediol the cyclic PET trimer (3,6,13,16,23,26-hexaoxatetracyclo[26.2.2.28, 11.218,21]hexatriaconta-1(30),8,10,18,20,28,31,33,35-nonaene-2,7,12,17,22,27-hexone; CAS No. 7441-32-9; obtained from Santa Cruz Biotechnology (Heidelberg, Germany)) was used as standard. For oligomers consisting of adipic acid, terephthalic acid, and butanediol, dibutyl adipate (CAS No. 105-99-7) was used as internal reference. The stock solutions were prepared in dichloromethane and acetonitrile, dilutions were freshly prepared in a mixture of ACN/water (1/1, v/v).

Polyester i i-1 Polybutylene Adipate Coterephthalate

The polyester was produced by mixing 87.3 kg of dimethyl terephthalate, 80.3 kg of adipic acid, 117 kg of 1,4-butanediol, and 0.2 kg of glycerol together with 0.028 kg of tetrabutyl orthotitanate (TBOT), the molar ratio between alcohol component and acid components here being 1.30. The reaction mixture was heated to a temperature of 180° C., and reacted for 6 h at this temperature. The temperature was then increased to 240° C., and the excess dihydroxy compound was removed by distillation in vacuo over a period of 3 h. 0.9 kg of hexamethylene diisocyanate was then slowly metered into the mixture at 240° C. within 1 h.

The melting point in accordance with DSC of the resultant polyester A was 119° C., its molar mass (Mn) was 23 000 g/mol, and its MVR (at 190° C.; 2.16 kg) was 3.3 mL/10 min.

This polyester A was pelletized in an extruder with underwater pelletization (UWP) to give pellets.

The cyclic dimer proportion [cyclic 2AA 2BDO is the dimeric ester formed from two adipic acid (AA) units, and two 1,4-butanediol (BDO) units; cyclic AA TPA 2BDO is the dimeric ester formed from adipic acid and terephthalic acid (TPA), and two 1,4-butanediol units; cyclic 2TPA 2BDO is the dimeric ester formed from two terephthalic acid units, and two 1,4-butanediol units] after LC-HRMS was 1431 ppm based on the total weight of polyester i-1. The cyclic trimer proportion [cyclic 3AA 3BDO is the trimeric ester formed from three adipic acid (AA) units, and three 1,4-butanediol (BDO) units; cyclic 2AA TPA 3BDO is the trimeric ester formed from two adipic acid units, terephthalic acid (TPA), and three 1,4-butanediol units; cyclic AA 2TPA 3BDO is the trimeric ester formed from adipic acid, two terephthalic acid units, and three 1,4-butanediol units; cyclic 3TPA 3BDO is the trimeric ester formed from three terephthalic acid units and three 1,4-butanediol units] after LC-HRMS was 1342 ppm based on the total weight of polyester i-1.

i-2 Polybutylene Adipate Coterephthalate (without Chain Extension)

Polybutylene adipate-co-terephthalate (adipic acid:terephthalic acid=53:47 mol %); the MVR (190° C./2.16 kg in accordance with ISO 1133)=from 129-130 mL/10 min i-3 Polybutylene Sebacate Coterephthalate Dimethyl terephthalate (70.11 kg), 1,4-butanediol (90.00 kg), glycerol (242.00 g), tetrabutyl orthotitanate (TBOT) (260.00 g) and sebacic acid (82.35 kg) were initially charged to a 250 L tank and the apparatus was purged with nitrogen. Methanol was distilled off up to an internal temperature of 200° C. After cooling down to about 160° C., the mixture was condensed in vacuo (<5 mbar) at up to an internal temperature of 250° C. Attainment of the desired viscosity was followed by cooling to room temperature. The prepolyester had a viscosity number of 80 mL/g.

Chain extension was carried out in a Rheocord 9000 Haake kneader having a Rheomix 600 attachment. The prepolyester was melted at 220° C. and the melt was admixed with 0.5 wt %, based on polyester I, of HDI (hexamethene diisocyanate) by dropwise addition. Reaction progress was tracked by observing the torque. The reaction mixture was cooled down after attainment of the maximum torque, and the chain-extended biodegradable polyester was removed and characterized. Polyester i-3 had an MVR of 3.9 cm$^3$/10 min.

The cyclic monomer [Cyclic SeA BDO and cyclic dimer proportion [cyclic 2SeA 2BDO is the dimeric ester formed from two sebacic acids (SeA) units, and two 1,4-butanediol (BDO) units; cyclic SeA TPA 2BDO is the dimeric ester formed from sebacic acid and terephthalic acid (TPA), and two 1,4-butanediol units; cyclic 2TPA 2BDO is the dimeric ester formed from two terephthalic acid units, and two 1,4-butanediol units] after LC-HRMS was 1562 ppm based on the total weight of polyester i-3. The cyclic trimer proportion [cyclic 3SeA 3BDO is the trimeric ester formed from three sebacic acid (SeA) units, and three 1,4-butanediol (BDO) units; cyclic 2SeA TPA 3BDO is the trimeric ester formed from two sebacic acid units, terephthalic acid (TPA), and three 1,4-butanediol units; cyclic SeA 2TPA 3BDO is the trimeric ester formed from sebacic acid, two terephthalic acid units, and three 1,4-butanediol units; cyclic 3TPA 3BDO is the trimeric ester formed from three terephthalic acid units and three 1,4-butanediol units] after LC-HRMS was 853 ppm based on the total weight of polyester i-3.

PERFORMING THE DEGASSING IN THE MELT

Example 1

The polyester granulate of polyester i-1 was continuously melted with the aid of a kneader, the melting temperature at the outlet of the kneader being about 200° C.-220° C. The necessary melting energy was supplied to the material via the heater bands of the cylinder and via shearing (rotational speed of the kneader). Alternatively, it was also possible for the polyester to be melted using a single-screw or twin-screw extruder in order to be then supplied from above (laterally) to the vertical thin film evaporator via a heated pipe using a melt pump. In the experiments, the throughput was between 15 and 40 kg/h.

In the thin film evaporator (type Filmtruder), the melt was drawn out to form a thin film having a thickness of about 1 mm with the aid of a rotor and the appropriate blade geometries and transported downward. The outer shell of the evaporator was heated (200-280° C.) and the residence time in the thin film evaporator was determined/varied via the rotor speed.

At the same time, it was possible to supply an entraining agent from below in countercurrent and, for better degassing, a vacuum was applied. Once the melt had arrived in the lower part of the thin film evaporator, it was continuously discharged with the aid of a melt pump and drawn out to form strands via a die plate. These were cooled in a water bath and supplied to a granulator in order to then obtain granulate again. As an alternative to strand granulation, it was also possible to use underwater granulation after the melt discharge pump.

The oligomers were removed under vacuum in the upper region of the thin film evaporator and subsequently condensed.

TABLE 1

| Example | Unit | Polyester i-1 | V1 | 1 |
|---|---|---|---|---|
| Temperature (kneader) | ° C. | | 200 | 200 |
| Temperature (thin film evaporator) | ° C. | | 222 | 229 |
| Temperature (steam) | ° C. | | | 100 |
| Throughput | kg/h | | 20 | 20 |
| Average residence time | min | | 15 | 15 |
| Film thickness | mm | | 1.3 | 1.3 |
| Vacuum | mbar | | 0.5 | 3.1 |
| Stripping medium | | | — | H$_2$O (steam) |
| Amount | | | — | 2% by weight |
| Speed of rotation | rpm | | 221 | 293 |
| Cyclic dimer proportions (total) | ppm | 1431 | 1350 | 897 |
| Cyclic trimer proportions (total) | ppm | 1342 | 1346 | 1214 |
| Cyclic 2AA 2BDO* | ppm | 784 | 750 | 454 |
| Cyclic AA TPA 2BDO** | ppm | 519 | 475 | 335 |
| Cyclic 2TPA 2BDO*** | ppm | 128 | 125 | 108 |
| Cyclic 3AA 3BDO# | ppm | 262 | 258 | 207 |
| Cyclic 2AA TPA 3BDO## | ppm | 592 | 591 | 527 |
| Cyclic AA 2TPA 3BDO### | ppm | 363 | 367 | 349 |
| Cyclic 3TPA 3BDO#### | ppm | 125 | 130 | 131 |
| Cyclic oligomers Total | ppm | 4150 | 3930 | 3440 |

TABLE 1-continued

| Example | Unit | Polyester i-1 | V1 | 1 |
|---|---|---|---|---|
| THF | | | | |
| Start | ppm | — | 350 | 350 |
| End | ppm | — | 180 | 70 |

*Cyclic 2AA 2BDO is the cyclic ester dimer containing two adipic acid units and two 1,4-butanediol units
**Cyclic AA TPA 2BDO is the cyclic ester dimer containing adipic acid, terephthalic acid and two 1,4-butanediol units
***Cyclic 2TPA 2BDO is the cyclic ester dimer containing two terephthalic acid units and two 1,4-butanediol units
Cyclic 2AA TPA 3BDO is the cyclic ester dimer containing 2 adipic acid units, terephthalic acid and three 1,4-butanediol units
Cyclic AA TPA 2BDO is the cyclic ester dimer containing adipic acid, terephthalic acid and two 1,4-butanediol units
Cyclic AA 2TPA 3BDO is the cyclic ester dimer containing adipic acid, two terephthalic acid units and three 1,4-butanediol units
Cyclic 3TPA 3BDO is the cyclic ester dimer containing three terephthalic acid units and three 1,4-butanediol units Example 2

Example 2 was carried out similar to example 1 but polyester i-3 was used instead of polyester i-1.

The results are collected in table 2.

TABLE 2

| Example | | Polyester i-3 | 2 |
|---|---|---|---|
| Stripping medium | | | H₂O (steam) |
| Amount | | | 2% by weight |
| Speed of rotation | rpm | | 293 |
| Cyclic monomer and dimer proportions (total) | ppm | 1562 | 865 |
| Cyclic trimer proportions (total) | ppm | 853 | 789 |
| Cyclic SeA BDO | ppm | 414 | 114 |
| Cyclic 2SeA 2BDO | ppm | 397 | 284 |
| Cyclic SeA TPA 2BDO | ppm | 628 | 366 |
| Cyclic 2TPA 2BDO | ppm | 123 | 101 |
| Cyclic 3SeA 3BDO# | ppm | 126 | 109 |
| Cyclic 2SeA TPA 3BDO## | ppm | 374 | 332 |
| Cyclic SeA 2TPA 3BDO### | ppm | 217 | 211 |
| Cyclic 3TPA 3BDO#### | ppm | 136 | 137 |
| Cyclic oligomers Total | ppm | 4570 | 3820 |
| THF | | | |
| Start | ppm | — | 380 |
| End | ppm | — | 90 |

Example 3

The degassing was performed in a thin film evaporator (Sambay). The thin film evaporator had the following general characteristics: The evaporator surface was a tube having a mechanical stirring means in the middle. The melt was passed on to the vertical evaporator surface from above. The thin film evaporator generated a thin film (melt film) on the inner wall of a heated outer shell by mechanical means using a rotor. This resulted in continuous surface replacement, thus ensuring good mass transfer and therefore a high degassing performance. The degassing performance was achieved by addition of a stripping agent (for example water or steam) which was supplied in countercurrent. Also required for good degassing performance was a vacuum of not more than 5 mbar.

The shape and configuration of the individual rotor blades allowed transport of the viscous product to the discharge section of the processor. The film thickness and the melt conveying was likewise dependent on the geometry of the rotor blades. The large free gas volume allowed a high evaporative concentration ratio in one stage without the risk of product entrainment into the condensation system.

Example 3 delivered similar results than Example 1: the cyclic ester dimers have been reduced by 32%. The employed Sambay evaporator as described hereinabove, the outer shell being made of glass rather than metal.

The polyester i-2 was filled into the apparatus as a melt from above and to the side of the vertical glass surface/evaporator surface and melted. After melting the polyester was introduced into the apparatus and spread into a thin film by a stirring means. The stripping agent was introduced in countercurrent from below and a vacuum was then applied. Using the temperature, vacuum and stripping medium reported in table 1 the cyclic oligomers and further byproducts such as for example THF were withdrawn overhead and condensed in the cooler. After the experiment the polyester and the discharged substances were analyzed by LC-HRMS.

The invention claimed is:

1. A continuous process for purifying polybutylene adipate coterephthalate in a degassing apparatus, wherein the crude polyester is degassed with an average residence time of 3 to 30 minutes and at a pressure of 0.01 to 5 mbar in the presence of 1% to 7% by weight, based on the total weight of the crude polyester, of an entraining agent, and forming a purified polybutylene adipate coterephthalate.

2. The continuous process according to claim 1, wherein the entraining agent is introduced into the gas space of the degassing apparatus.

3. The continuous process according to claim 1, wherein the entraining agent is selected from the group consisting of: additionally introduced water, ethanol, nitrogen, carbon dioxide, acetone and cyclic propylene carbonate.

4. The continuous process according to claim 3, wherein the entraining agent is selected from additionally introduced water and nitrogen.

5. The continuous process according to claim 4, wherein the entraining agent is introduced into the gas space of the degassing apparatus.

6. The continuous process according to claim 1, wherein the degassing apparatus is a thin film evaporator.

7. The continuous process according to claim 1, wherein the degassing apparatus has an internal temperature of 180° C. to 260° C.

8. The continuous process according to claim 1, wherein the crude polyester in the degassing apparatus has a film thickness of less than 2 mm.

9. The continuous process according to claim 1, wherein the crude polyester has an MVR according to DIN EN 1133-1 of Jan. 3, 2012 (190° C., 2.16 kg) of 0.1 to 50 cm³/10 min.

10. The continuous process according to claim 1, wherein the purification process succeeds the polycondensation stage and the chain extension of the crude polyester and precedes the isolation of the purified polybutylene adipate coterephthalate.

11. The continuous process according to claim 1, wherein the polybutylene adipate coterephthalate has a ratio of cyclic ester dimers to cyclic ester trimers determined by LC-HRMS of less than 1, based on the total weight of the polybutylene adipate coterephthalate.

12. The continuous process according to claim 1, wherein the polybutylene adipate coterephthalate has a content by weight of cyclic ester dimers of less than 1200 ppm, based on the total weight of the polybutylene adipate coterephthalate.

13. The continuous process according to claim 1, wherein the polybutylene adipate coterephthalate has a residual THF content of less than 300 ppm.

\* \* \* \* \*